US009066582B2

United States Patent
Cunningham et al.

(10) Patent No.: US 9,066,582 B2
(45) Date of Patent: Jun. 30, 2015

(54) MAINTENANCE DEVICE FOR FASTENERS

(75) Inventors: Christopher J. Cunningham, Palm Coast, FL (US); David Barnsdale, London (GB)

(73) Assignee: Christopher J. Cunningham, Palm Coast, FL (US)

( * ) Notice: Subject to any disclaimer, the term of this patent is extended or adjusted under 35 U.S.C. 154(b) by 530 days.

(21) Appl. No.: 13/595,619

(22) Filed: Aug. 27, 2012

(65) Prior Publication Data

US 2013/0209156 A1 Aug. 15, 2013

Related U.S. Application Data

(63) Continuation-in-part of application No. 13/084,112, filed on Apr. 11, 2011, now Pat. No. 8,277,135.

(51) Int. Cl.
*A46B 11/00* (2006.01)
*F16B 37/14* (2006.01)
*B63B 23/64* (2006.01)

(52) U.S. Cl.
CPC ............. *A46B 11/0072* (2013.01); *F16B 37/14* (2013.01); *B63B 23/64* (2013.01)

(58) Field of Classification Search
CPC ......... A47L 25/00; A47L 25/02; B08B 9/021; B08B 9/0436; B08B 1/00; A46B 2200/3006; A46B 2200/3013; A46B 2200/3073
USPC ............... 401/9–10, 37, 263, 264; 15/104.04, 15/104.18, 160, 164, 165, 211–213, 210.1
See application file for complete search history.

(56) References Cited

U.S. PATENT DOCUMENTS

| | | | | |
|---|---|---|---|---|
| 912,085 | A | * | 2/1909 | Davis ........................... 15/104.9 |
| 934,491 | A | * | 9/1909 | Weyh .......................... 15/104.18 |
| 961,563 | A | * | 6/1910 | Volckening ................... 15/104.9 |
| 2,238,554 | A | * | 4/1941 | Copping ............................ 34/95 |
| 2,248,389 | A | * | 7/1941 | Sanders et al. ..................... 34/95 |
| 2,506,075 | A | * | 5/1950 | Fleury ................................ 15/75 |
| 2,767,417 | A | * | 10/1956 | Amen ................................ 401/9 |
| 2,922,174 | A | * | 1/1960 | Mathews ................. 15/104.095 |
| 3,889,628 | A | * | 6/1975 | Usab .............................. 118/711 |
| 3,913,165 | A | * | 10/1975 | Behnk .......................... 15/244.1 |
| 4,117,566 | A | * | 10/1978 | Ward ............................ 15/244.1 |
| 4,263,692 | A | * | 4/1981 | Gremillion ................... 15/210.1 |
| 4,347,010 | A | * | 8/1982 | Petkoff .......................... 401/10 |
| 4,403,363 | A | * | 9/1983 | Hess .......................... 15/104.04 |
| 5,295,278 | A | * | 3/1994 | Condon et al. ............. 15/104.04 |
| 2004/0040113 | A1 | * | 3/2004 | Buzard ......................... 15/244.1 |
| 2011/0277788 | A1 | * | 11/2011 | Rogers et al. ..................... 134/6 |

* cited by examiner

*Primary Examiner* — David Walczak
*Assistant Examiner* — Bradley Oliver
(74) *Attorney, Agent, or Firm* — Stern & Schurin LLP

(57) ABSTRACT

There is provided in a preferred embodiment of the present invention a maintenance device having a central body and a lubricant container attached to the upper end of the central body. At a lower end of the central body, at least one dynamic body is provided and biased by a spring to an extended position relative to the central body. The dynamic member comprises a pair of cleaning arms that are outwardly biased. As a compression force is applied to the dynamic body, the biasing spring is compressed and the dynamic body is moved toward a retracted position relative to the central body. As the dynamic body retracts, the cleaning arms pivot inward and engage the fastener for cleaning.

20 Claims, 11 Drawing Sheets

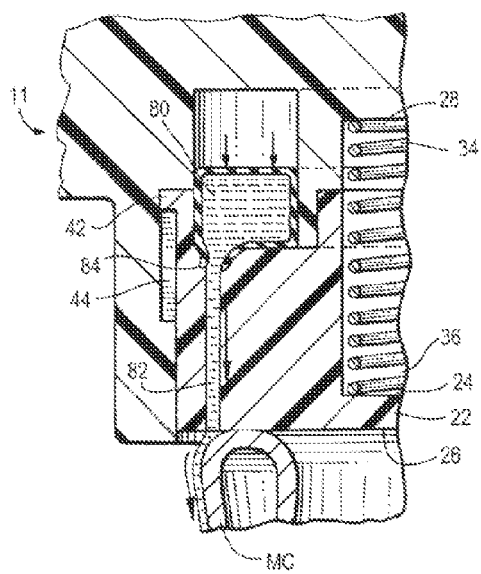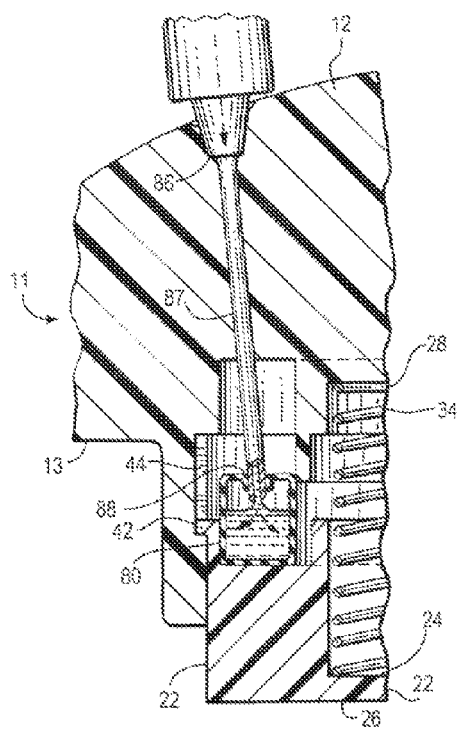

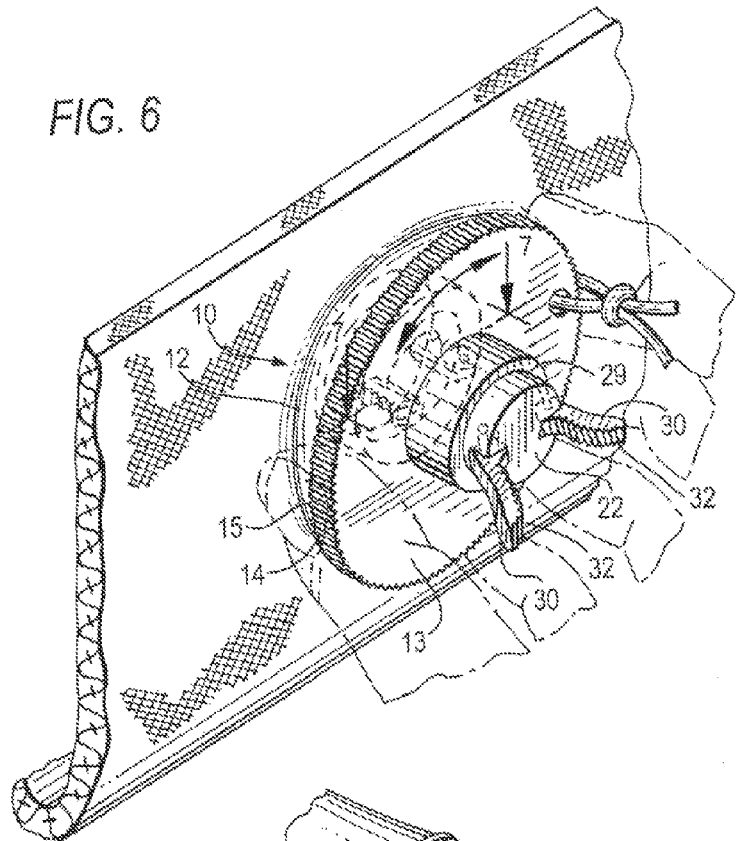
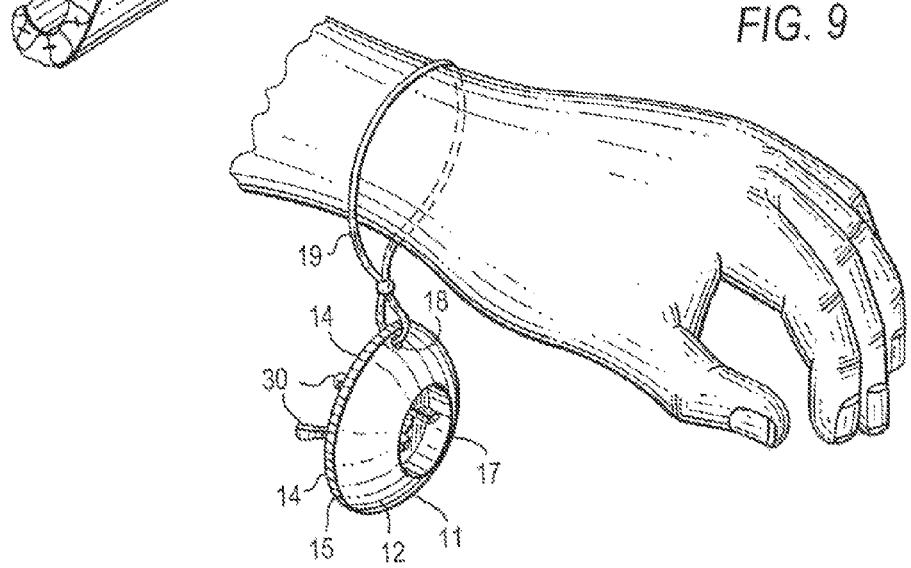

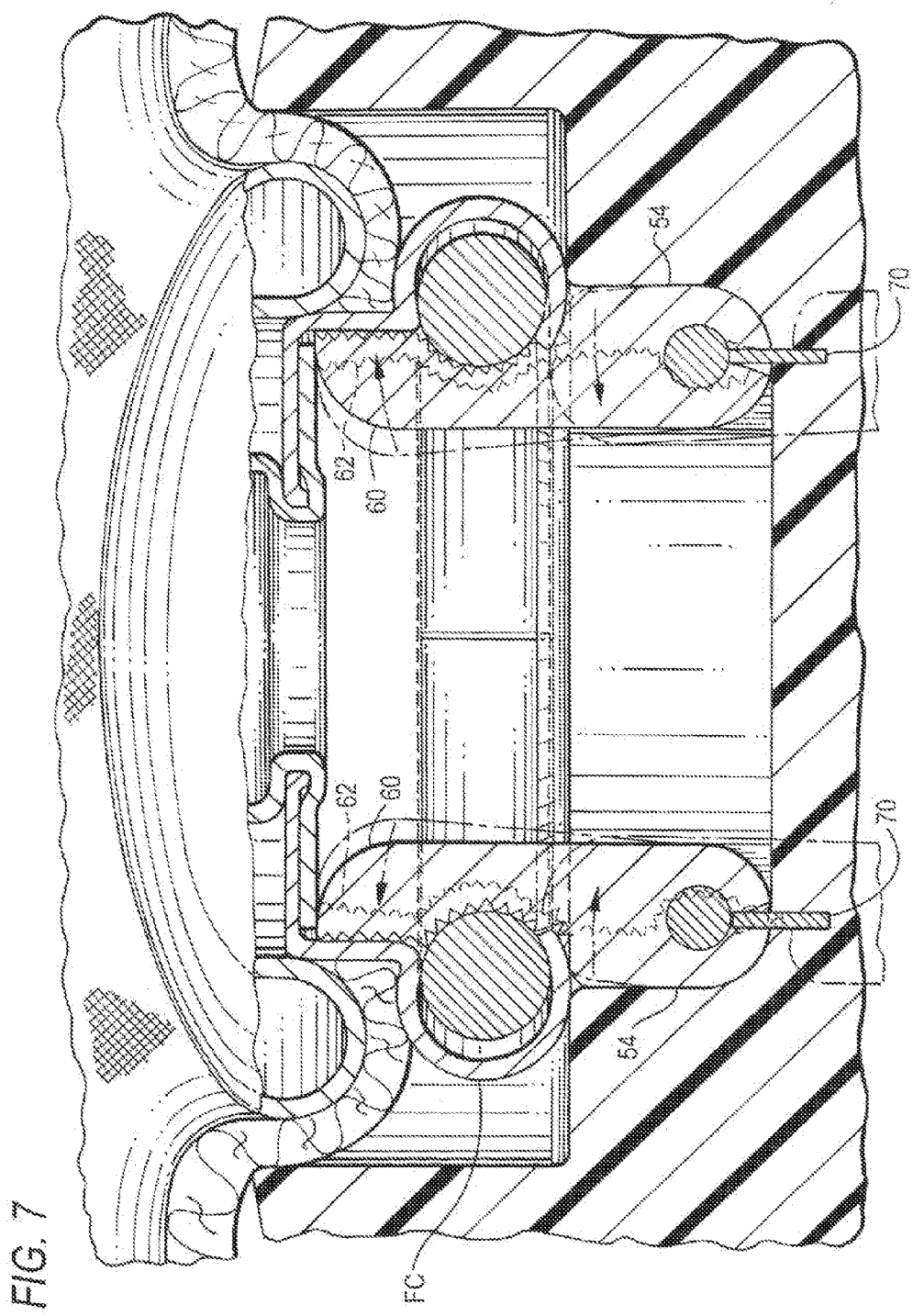

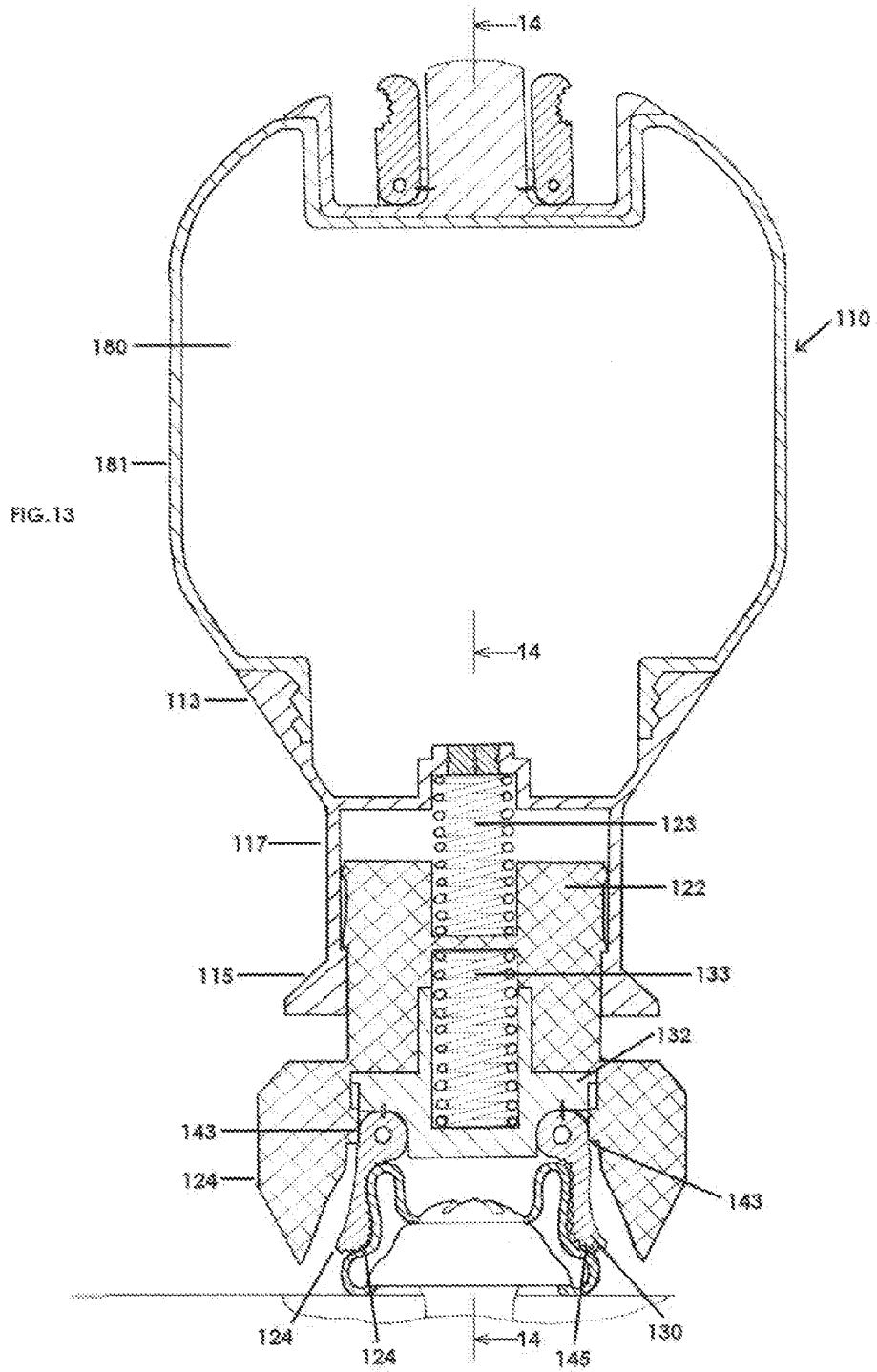

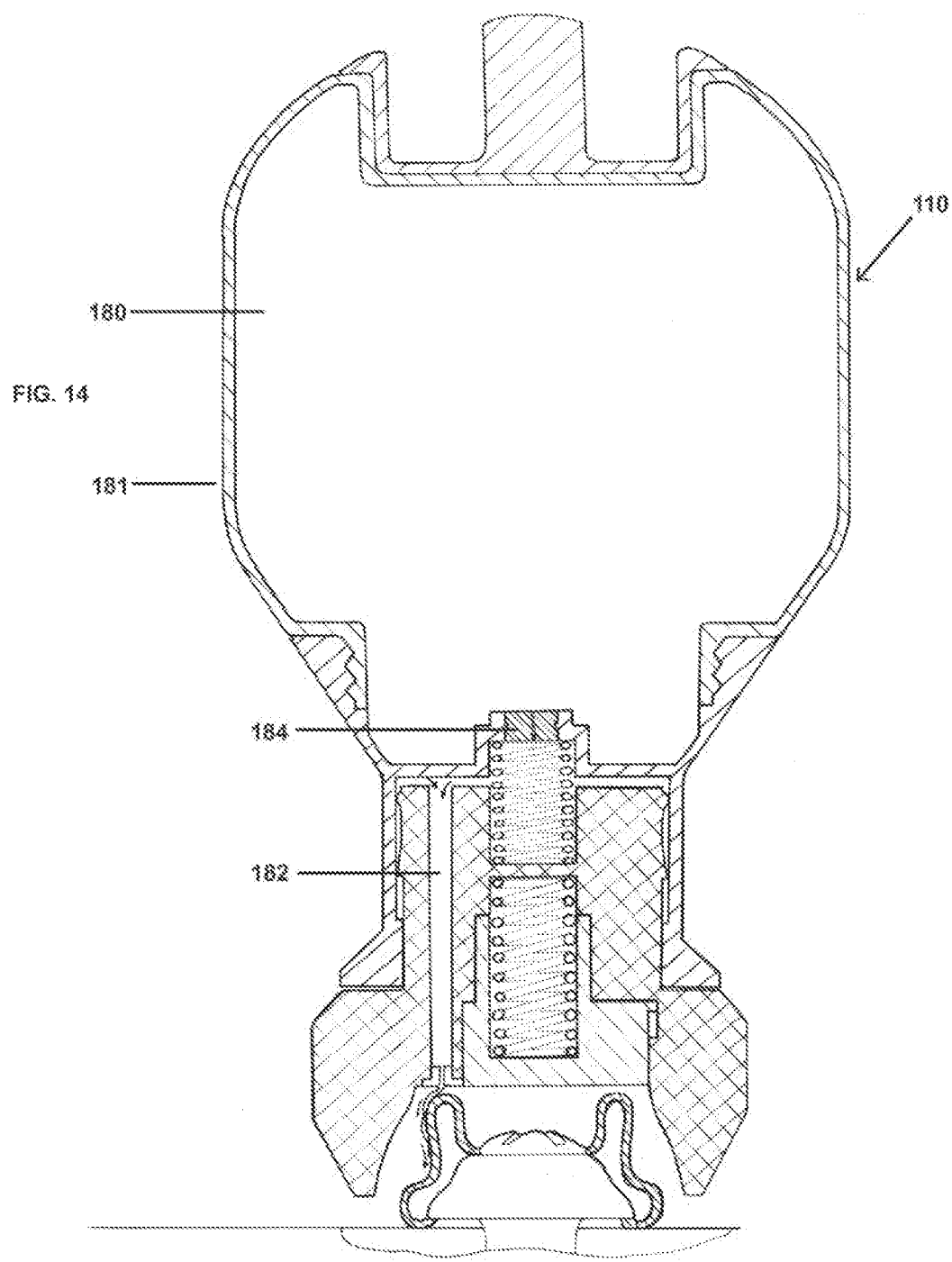

US 9,066,582 B2

MAINTENANCE DEVICE FOR FASTENERS

RELATED APPLICATION

This application is a continuation-in-part application of application Ser. No. 13/084,112, filed on Apr. 11, 2011 now U.S. Pat. No. 8,277,135 and now allowed, which is incorporated herein by reference.

FIELD OF THE INVENTION

This invention relates generally to a maintenance device used in the preservation of fasteners. More specifically, this invention involves a device for lubricating and cleaning fasteners. Even more particularly, this invention covers a device used in the context of boat maintenance which is adapted to lubricate and clean snaps that attach tarps or canvas covers to boats.

BACKGROUND OF THE INVENTION

Exposed surfaces of boats are vulnerable to corrosion and weather damage because of their proximity to water, humidity and corrosive salts. Fasteners or snaps on a boat are especially vulnerable to corrosion and dirt and salt build-up because they are usually formed of metal and incorporate semi-confined areas where moisture, dirt and salt can collect. Such fasteners are commonly used to attach canvas tarps for covering a boat when docked. When the fasteners corrode, they become less effective and may fail to properly secure a tarp. Additionally, corroded and discolored fasteners are unsightly and detract from the aesthetic appeal of the boat.

Existing techniques for maintaining the fasteners of a boat may include employing a rag and cleaning chemicals to remove corrosion and salt from the fastener. However, using harsh chemicals to maintain and clean a fastener may cause damage to the surrounding surfaces of the boat. Alternatively, boaters may use a hard tool, such as a brush with metallic bristles or a small flat edge on a screwdriver, to scrape away corrosion. However, utilizing a tool with a metallic end may likewise cause damage to the surface of the boat or the fastener intended to be cleaned.

Another maintenance technique may incorporate the application of a grease-type lubricant, such as petroleum jelly, directly to a fastener with a swab or other applicator in order to protect the fastener from corrosion. However, these types of lubricants are often messy and difficult to work with, making it particularly difficult to apply just enough lubrication to the fastener without applying an excess amount. Petroleum jelly also tends to run and ooze when exposed to the sun for a long period of time.

SUMMARY OF THE INVENTION

In view of the deficiencies and drawbacks in the prior art, it is a primary object of the present invention to provide a maintenance device for a fastener that removes corrosion and dirt and applies lubrication to fasteners to preserve the fastener for an extended period of time.

Another objective of the present invention is to provide a maintenance device is sized and adapted to clean and lubricate standard tarp fasteners.

A further objective of the present invention is to provide a maintenance device that is adapted to clean and lubricate both male and female ends of a fastener.

A further objective of the present invention is to provide a maintenance device with a self-contained lubrication system that applies an appropriate amount of lubricant to a fastener.

Additional objectives will be apparent from the description of the invention that follows.

In summary, provided in a preferred embodiment of the present invention is a maintenance device having a housing and a dynamic body that is slidably engaged within said housing. Attached to the slidable body is a pair of cleaning arms that comprise an abrasive material. A spring positioned between the body and the housing biases the body and arms to a relaxed and extended position. When the body is pressed against and engages a male portion of the fastener, the body moves to a retracted position within the housing. As the body retracts, each of the cleaning arms pivot and engage the side wall of the male connector. With the abrasive surface of the cleaning arm engaging to the outer wall of the male-end connector, a twisting movement of the housing removes corrosion, dirt and debris from the male portion of the fastener.

In a preferred embodiment, the maintenance device further includes a second pair of cleaning arms for cleaning the female portion of the fastener. The female cleaning arms are positioned at the top portion of the housing, opposite the male cleaning arms which are positioned at the bottom portion of the housing.

In another preferred embodiment, the maintenance device comprises a central body and a lubricant container or bottle attached to the upper end of the central body. At a lower end of the central body, at least one dynamic body is provided with a pair of cleaning arms that are outwardly biased. The dynamic body is biased by a spring to a relaxed and extended position relative to the central body. As force is applied to the dynamic body, the biasing spring is compressed and the dynamic body is moved to a retracted position relative to the central body. As the dynamic body retracts, the cleaning arms pivot inward and engage the fastener.

BRIEF DESCRIPTION OF THE DRAWINGS

The above-described and other advantages and features of the present disclosure will be appreciated and understood by those skilled in the art from the following detailed description and drawings of which.

FIG. 5 is a cross-section view taken along lines 5-5 of FIG. 4 of the lubricant reservoir and channel applying lubrication to a cleaning arm;

FIG. 6 is a perspective view of the maintenance device being used on a female portion of the fastener;

FIG. 7 is a cross-section view taken along lines 7-7 of FIG. 6 of the maintenance device engaging the female portion of the fastener;

FIG. 8 is a cross-section view of the lubricant reservoir receiving lubricant from an injector, and the slidable body in a non-engaged position relative to the housing;

FIG. 9 is a perspective view of the maintenance device attached to the hand of a user;

FIG. 13 is a cross-section view of the third preferred embodiment of the maintenance device with the first dynamic body dynamic in an extended position and the second dynamic body in a retracted position; and FIG. 14 is a cross section view taken along lines 14-14 of FIG. 13 showing a lubrication channel and lubricant lubricating the male connector portion of a fastener.

DETAILED DESCRIPTION OF THE INVENTION

Figure 1:
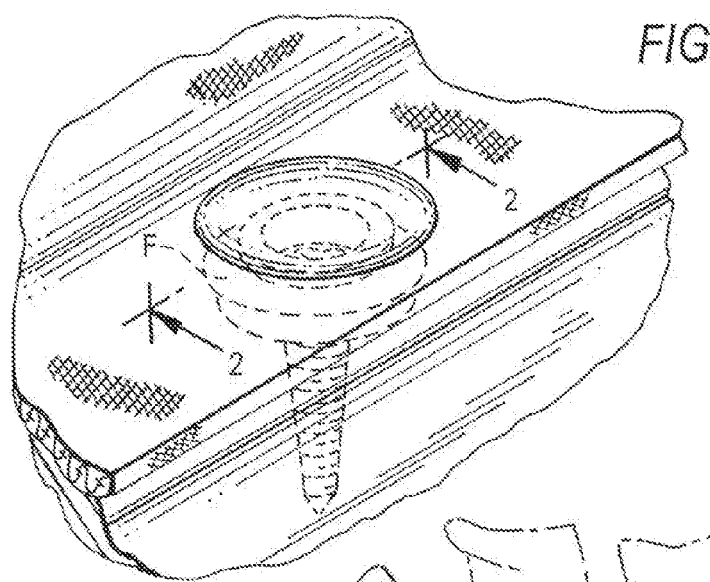
FIG. 1 is a perspective view of a conventional fastener attached a boat hull and tarp cover.
Figure 2:
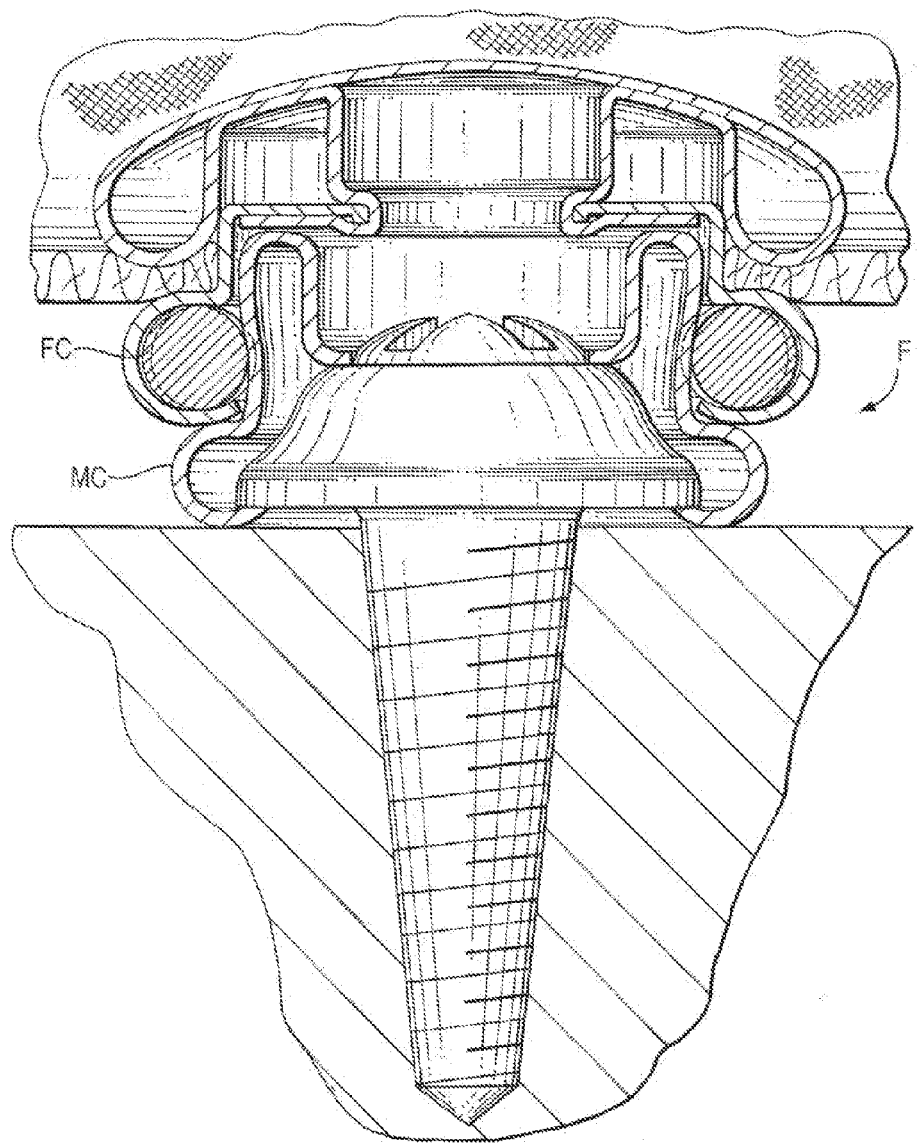
FIG. 2 is a cross-section view thereof taken along lines 2-2 of FIG. 1.

With reference to the accompanying drawings, there is shown in FIGS. 1 and 2 a conventional snap or fastener F having a male connector portion MC and a female connector portion FC. The fastener F is used to secure a tarp, canvas or other suitable (e.g., waterproof or weatherproof) cover to a boat hull. The conventional fastener F includes a screw S fixed to the male connector portion MC. Typically, the screw S, along with the male connector portion MC to which it is attached, is driven into the boat hull, at an edge thereof. This forms one half of the fastener F. The other half of the fastener F is formed with the female connector portion FC, which includes two parts—an upper section and a lower section—which sandwich the cover therebetween. Together, the male connector portion MC and female connector portion FC fasten and secure the cover to the boat.

Figure 3:
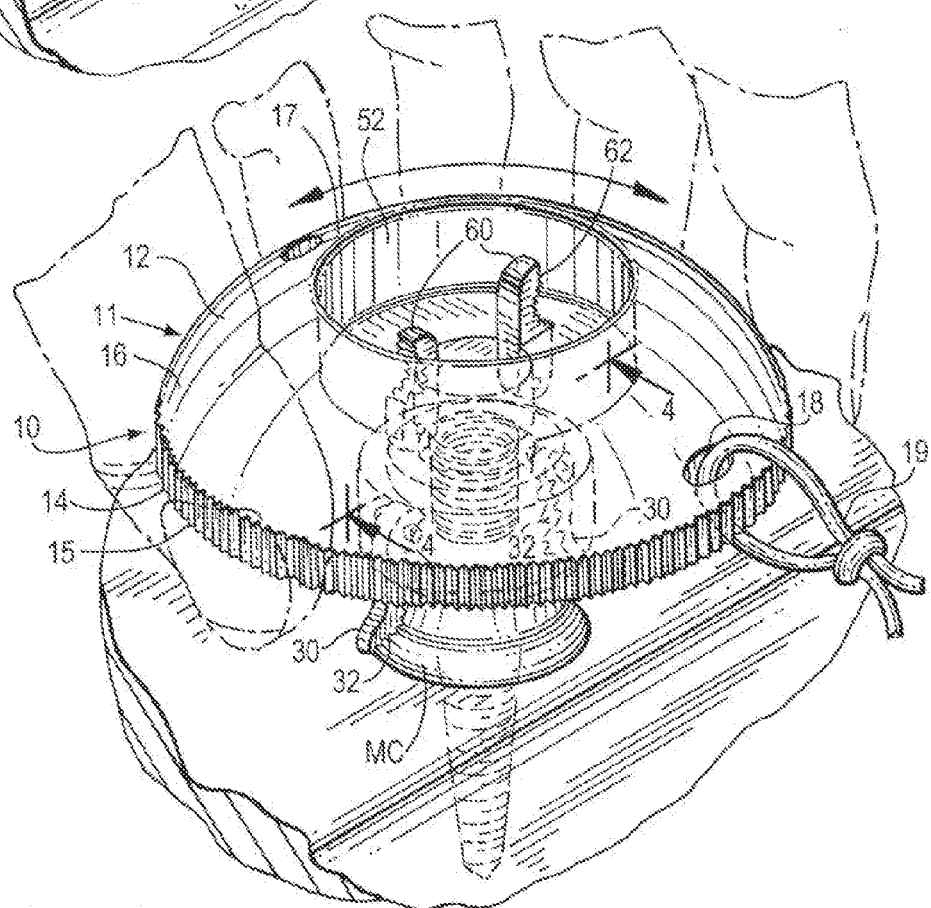
FIG. 3 is a perspective view of a first preferred embodiment of the maintenance device of the present invention being used on a male portion of the fastener shown in FIG. 1 and FIG. 2.

With reference to FIGS. 3 through 9, there is shown a first preferred embodiment of the maintenance device 10 of the present invention. FIG. 3 illustrates the maintenance device 10 engaging and cleaning a male connector portion MC of a fastener F. The maintenance device 10 comprises a housing 11 having an upper, domed section 12 that culminates in a generally planar bottom section 13. At its lower extremity, the domed section 12 incorporates a knurled or textured surface 14 around its outer perimeter 15. The textured surface 14 allows a user to grip the maintenance device 10 and to manipulate and twist the maintenance device 10 as part of the cleaning and lubrication process. An annular region 16 in the housing 11 is defined by the outer perimeter 15 and a concentric ring 17.

As illustrated in FIGS. 3, 6 and 9, the maintenance device 10 preferably incorporates an aperture 18 in the housing 11 and a lanyard or cord 19 so that the maintenance device 10 it does not unintentionally fall into the water. It should be understood that other appropriate means to secure the maintenance device to a user or a boat may be utilized as well. Likewise, it should be understood that that the cord should be of sufficient length to allow the device to be secured to a user when the device is in use.

Figure 4:
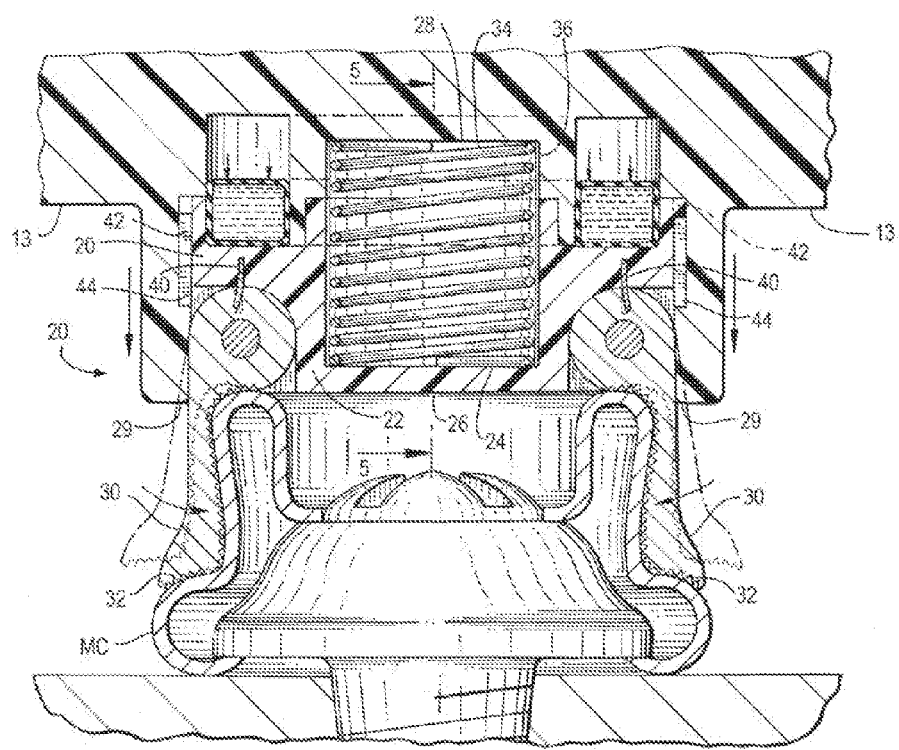
FIG. 4 is a cross-section view taken along lines 4-4 of FIG. 3 of the maintenance device with the slidable body in a retracted position, cleaning and lubricating the male portion of the fastener.

A cross-section of the preferred embodiment of the maintenance device 10 in the process of cleaning and lubricating a male connector portion MC of a fastener F is illustrated in FIG. 4. The maintenance device 10 includes a male cleaning and lubricating mechanism 20 adapted to clean and lubricate a male connector portion MC of a fastener F. The male cleaning mechanism 20 is centrally positioned at the planar bottom section 13 of the housing 11. Primary components of the male cleaning mechanism 20 are a dynamic body 22 that is slidably engaged within the housing 11 and a pair of cleaning arms 30, 30 that serve to clean and lubricate a male connector portion MC of a fastener F.

Male cleaning arms 30, 30 are hingedly attached to the dynamic body 22. Male cleaning arms 30, 30 preferably include an abrasive or otherwise harsh material 32 to effectively clean a fastener having dirt or salt thereon. However, it should be understood that less harsh materials, such as terrycloth, may be utilized as well. While the preferred embodiment of the present invention illustrates a maintenance device having two male cleaning arms, it should be understood that one male cleaning arm or more than two male cleaning arms may be utilized while still keeping within the spirit and scope of the invention.

When the male cleaning mechanism 20 of the maintenance device 10 is in a relaxed and extended position, a spring 34 biases the dynamic body 22 to an extended position relative to the housing. The spring 34 is positioned in a cavity 36 formed between the interior base 24 of the dynamic body 22 and the housing ceiling 28, causing the dynamic body 22 to extend downward unless an opposing force is applied. Likewise, when the male cleaning mechanism 20 of the maintenance device 10 is in a relaxed and extended position, tension elements 40, 40 face downward, thereby causing male cleaning arms 30, 30 to flare outward, as shown in FIG. 6.

During use of the male cleaning mechanism 20, the exterior surface 26 of the dynamic body 22 is pressed against the top of the male connector portion MC, causing the dynamic body 22 to retract into the housing 11 by compressing the spring 34. As shown in FIG. 4, as the dynamic body 22 retracts, cleaning arms 30, 30 are progressively forced by the housing lip 29 to pivot inward toward a cleaning position from a flared position until the arms 30, 30 are moved into a substantially downwardly aligned position. Thus, retracting motion of the dynamic body 22 combined with the housing lip 29 urges the arms 30, 30 inward toward a cleaning position. When the male cleaning mechanism 20 of the maintenance device 10 is in use, tension elements 40, 40 are flexed laterally outward to a modest degree.

When the male cleaning mechanism 20 of maintenance device 10 is in use, the arms 30, 30 bear against the exterior of the male connector portion MC. As the maintenance device 10 is twisted, the abrasive surface 32 of the arms 30, clean corrosion and other unwanted build-up from male connector wall. Thereafter, upon disengagement of the dynamic body 22 from the top of the male connector portion MC, the spring 34 forces dynamic body 22 back to its relaxed and extended position. Upon disengagement, tension elements 40, 40 resume a downward orientation, thereby causing male cleaning arms 30, 30 to again assume a flared position.

The sliding motion of the dynamic body 22 relative to the housing 11 is limited by a stopper 42 attached to the dynamic body 22. The stopper 42 is able to travel the length of a small stopper channel 44, thereby limiting the distance that the body 22 can extend and retract relative to the housing 11. In a preferred embodiment, the channel 44 spans about ¼-¾ of an inch. When the male cleaning mechanism 20 is in an extended position the stopper 42 is positioned at the bottom of stopper channel 44. As the male cleaning mechanism 20 engages a male connector MC and the dynamic body 32 retracts into housing 11, stopper 42 moves towards the top of stopper channel 44. Upon reaching the top of stopper channel 44, further movement of the stopper 42 is prohibited. Since stopper 42 is fixed to dynamic body 22, the movement of dynamic body 22 is prohibited as well. During disengagement of the dynamic body 22 and the expansion of spring 24, stopper 42 travels and ultimately rests at the bottom of stopper channel 44.

A perspective view of the preferred embodiment of the maintenance device 10 in the process of cleaning a female connector portion FC of a fastener connected to a cover is shown in FIG. 6, and a cross-section view thereof is illustrated in FIG. 7. The maintenance device 10 includes a female cleaning mechanism 50 adapted to clean a female connector portion FC of a fastener F. The female cleaning mechanism 50 is centrally positioned at the upper domed section 12 of the housing 11. The concentric ring 17 defines a depression 52 within which the female cleaning mechanism is positioned. Primary components of the male cleaning mechanism 20 are a dynamic body 22 that is slidably engaged within the housing 11 and a pair of cleaning arms 30, 30 that serve to clean and lubricate a male connector portion MC of a fastener F.

Female cleaning arms 60, 60 are hingedly attached to the housing 11 at the base of the depression 52. Female cleaning arms preferably include an abrasive or otherwise harsh material 62 to effectively clean a fastener having dirt or salt thereon. However, it should be understood that less harsh materials, such as terrycloth, may be utilized as well. While the preferred embodiment of the present invention illustrates a maintenance device having two female cleaning arms, it should be understood that one male cleaning arm or more than two female cleaning arms may be utilized while still keeping within the spirit and scope of the invention.

The female cleaning arms 60, 60 of the female cleaning mechanism 50 are vertically oriented and biased outward with tension elements 70. Thus, while the male cleaning arms 30, 30 are intended to flare outward only when the male cleaning mechanism 20 is in a relaxed position, the female arms 60, 60 are biased outward at all times. While the female arms 60, 60 are biased outwards, the tension elements 70 and depression wall 54 prevent the female cleaning arms 60, 60 from becoming fully extended.

Upon engagement with a female connector portion FC, female cleaning arms 60, 60 are forced slightly inward, thereby applying increased outward pressure to the female connector portion with abrasive surface 62. Similar to the contact between the abrasive surface 32 of the male cleaning arms 30, 30 with the male connector portion MC, the pressure contact between the abrasive surface 62 of the female cleaning arms 60, 60 allows a user to repeatedly twist the maintenance device 10 clockwise and/or counterclockwise to clean the female connector FC.

As shown in FIG. 5, the maintenance device 10 further includes a flexible lubrication reservoir 80 which supplies lubricant that is spread by the male cleaning arms 30, 30 and the abrasive surface 32. The lubrication reservoir 80 supplies lubricant via output channel 82. Outbound flow of lubricant from the reservoir to male connector portion MC and/or the arms 30, 30 is controlled and restricted by reservoir output valve 84. When the dynamic body 22 presses against the reservoir 80, it forces flexible valve 84 to open, allowing lubricant to flow into the lubrication channel 82.

As shown in FIG. 8, the lubrication reservoir 80 is adapted to receive additional lubricant from a lubricant injector 86. The lubricant injector 86 is fitted with an input channel 87, which passes through housing 11 and provides lubricant to lubrication reservoir 80 via an input valve 88 which is adapted to prevent backflow of lubricant.

Figure 10:
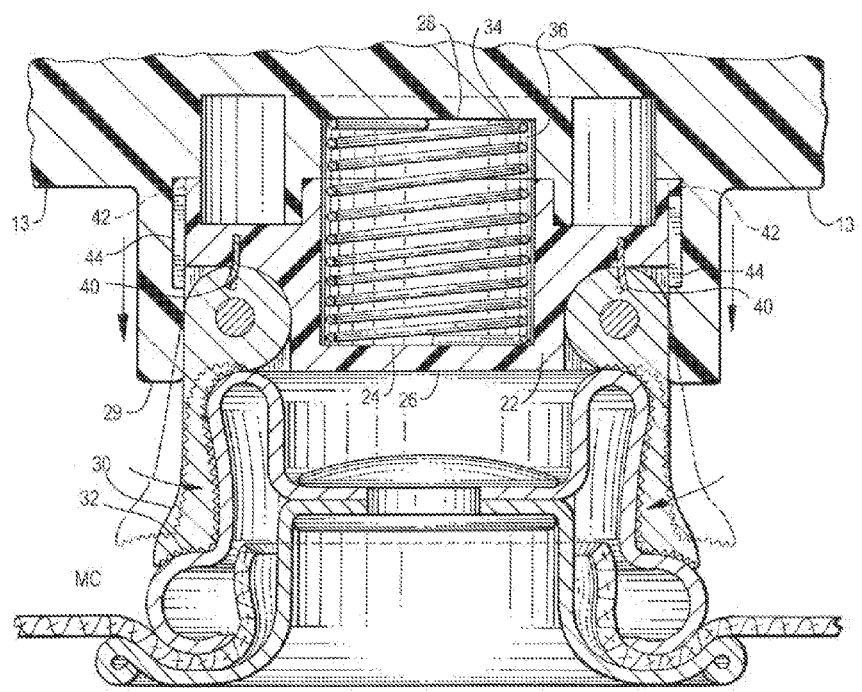
FIG. 10 is a cross-section view of a second preferred embodiment of the present invention without a lubricant reservoir.

FIG. 10 illustrates a second preferred embodiment of the present invention which is identical to the first preferred embodiment discussed above, except that it does not include a lubrication reservoir and other lubrication elements associated with the ability of the maintenance device to lubricate a fastener.

In an alternate embodiment of the maintenance device, the housing comprises one or more hollow regions having a sufficient volume to keep the maintenance device fully or at least partially afloat in the event it falls into the water. In such an embodiment, the hollow region is positioned beneath the domed portion of the housing in the annular region positioned between the perimeter and concentric ring defining the interior depression.

Figure 11:
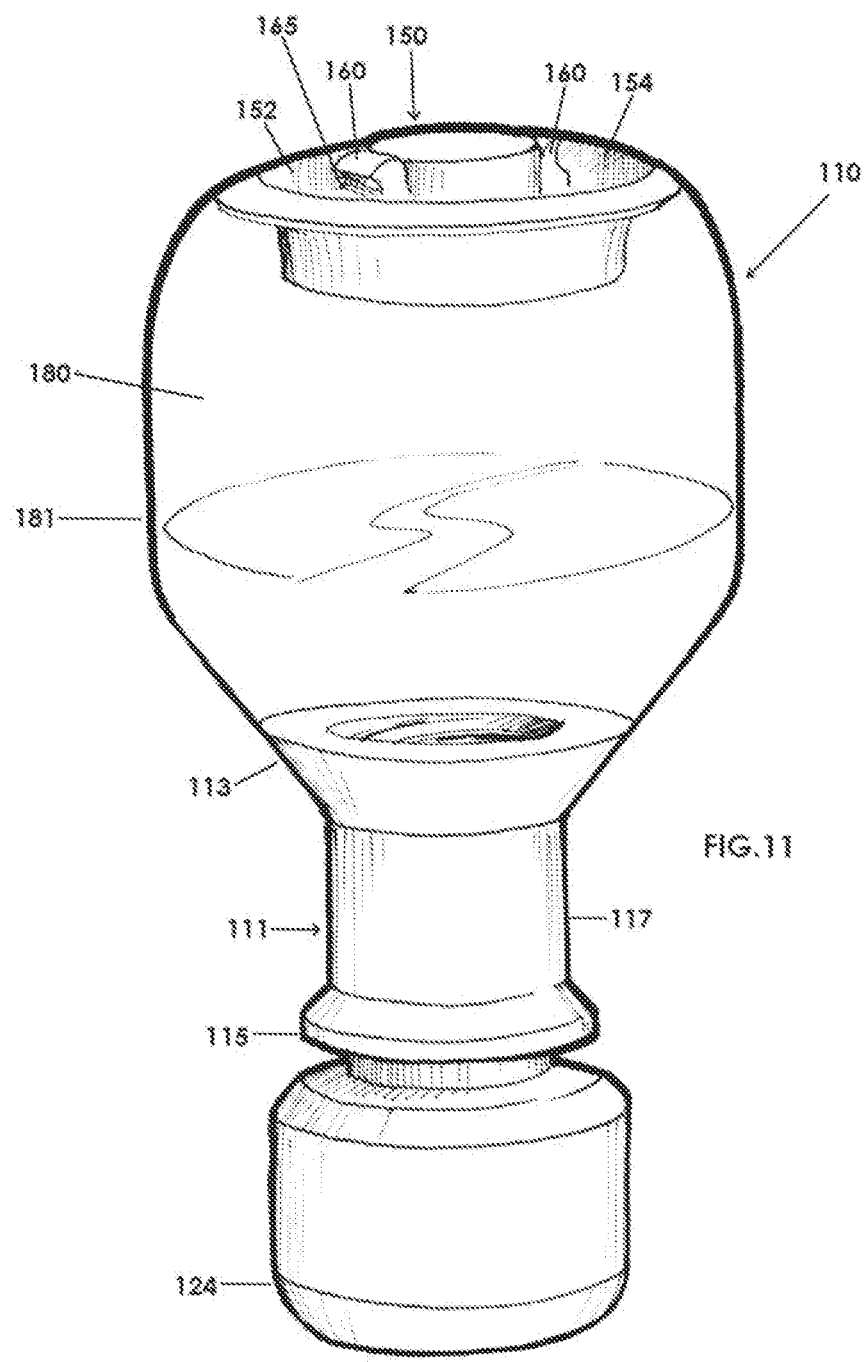
FIG. 11 is a perspective view of a third preferred embodiment of the maintenance device of the present invention.
Figure 12:
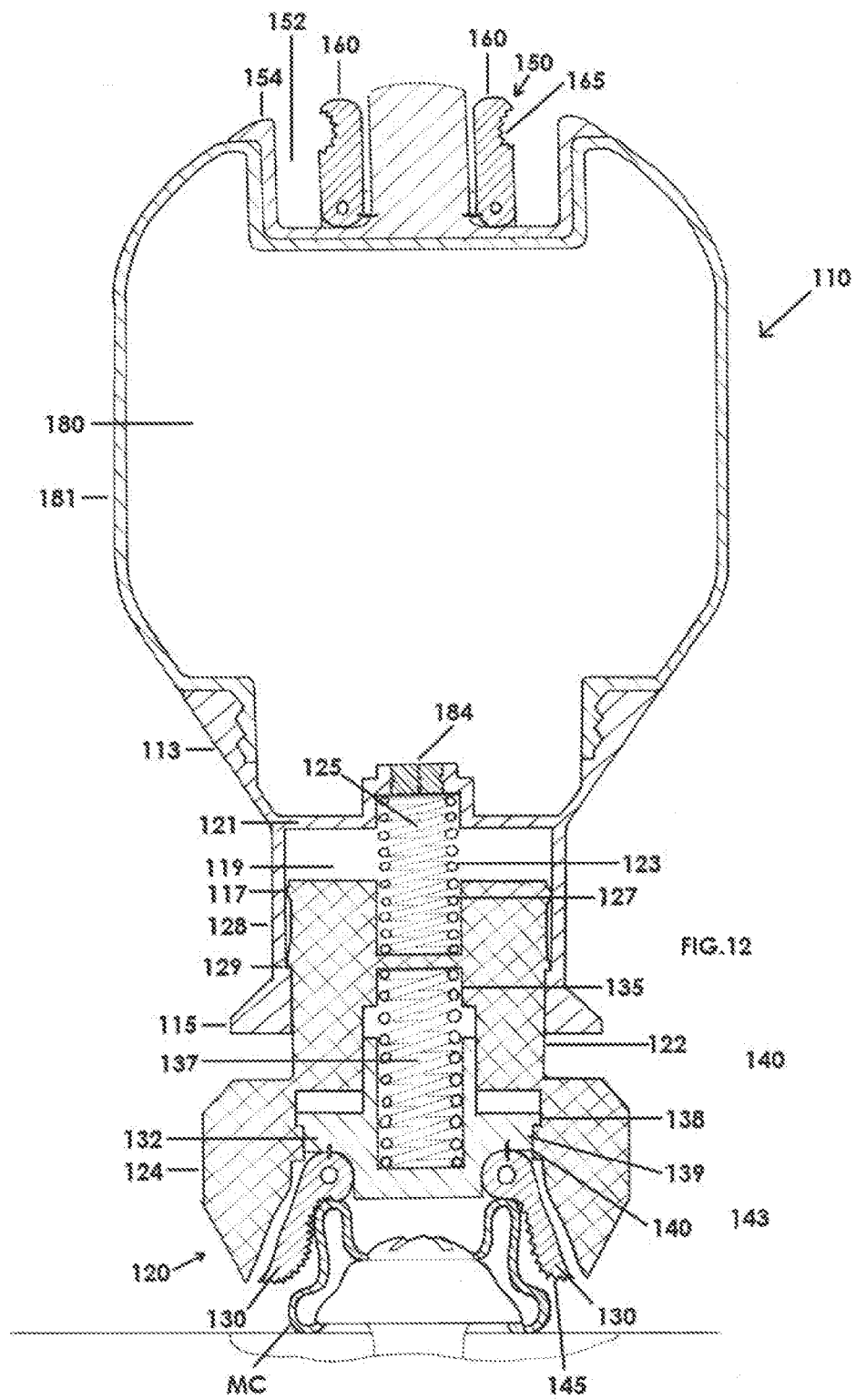
FIG. 12 is a cross-section view of the third preferred embodiment of the maintenance device with two dynamic bodies biased by springs to extended positions.

With reference to FIGS. 11 through 14, there is shown a third preferred embodiment of the maintenance device 110 of the present invention. FIG. 12 is a cross-section view, which illustrates the maintenance device 110 engaging and cleaning a male connector portion MC of a fastener F. As shown in FIG. 11 and FIG. 12, the maintenance device 110 comprises a lubrication reservoir 180 defined by a substantially transparent bulbous bottle or container 181 for holding lubricant at the upper portion of the maintenance device 110. As shown in FIG. 12, the bulbous container 181 is preferably threaded and removably attachable to a central body 111 of the maintenance device 110, allowing for easy filling and refilling of lubricant in the reservoir 180 as needed. It should be understood that the device 110 may be constructed so that said container 181 is not removable once it is attached to the central body 111.

The central body 111 has a configuration comparable to that of a thread spool, with a flared upper end 113, a flared lower end 115 and a cylindrical midsection 117 in between. The interior 119 of the central body 111 at the upper end 113 is preferably correspondingly threaded to receive the bulbous container 181.

Referring to FIG. 12, a divider 121 is positioned at the junction of the flared upper end 113 and midsection 117, dividing the reservoir 180 from the lower sections of the maintenance device 110. Within the interior 119 of the central body 111 beneath the divider 121 there is a first dynamic body 122 that is biased downward by a first biasing spring 123 positioned between the divider 121 and the upper portion of the first dynamic body 122. In order to prevent unwanted lateral movement of the first biasing spring 123, it is positioned within cavities 125, 127 formed in the divider 121 and the first dynamic body 122.

The first dynamic body 122 is kept within the interior 119 of the central body 111 against the biasing force of the spring 123 with a stopper 128 and stopping ledge 129 located adjacent to the lower end 115 of the central body 111. When an opposing force is applied to the first dynamic body 122, first biasing spring 123 is compressed until the top of the first dynamic body 122 contacts the divider 121, as shown in FIG. 14. Stopper 128 is able to travel the length of a small stopper channel, thereby limiting the distance that the first dynamic body 122 can extend and retract. In a preferred embodiment, the stopper channel spans about ¼-¾ of an inch. When the male cleaning mechanism 120 is in an extended position, the stopper 128 is positioned at the bottom of stopper channel. As the male cleaning mechanism 20 engages a male connector MC and the first dynamic body 122 retracts, stopper 128 moves towards the top of stopper channel. Upon reaching the top of stopper channel, further movement of the stopper 128 is prohibited. Since stopper 128 is fixed to the first dynamic body 122, the movement of the first dynamic body 122 is prohibited as well.

At the lower end of the maintenance device 110, the base of the first dynamic body 122 forms a cylindrical working head 124 sized to receive the male connector portion MC of the fastener F. The interior of the working head 124 houses a second dynamic body 132 that is biased downward by a second biasing spring 133 positioned directly between the first dynamic body 122 and the second dynamic body 132. In order to prevent unwanted lateral movement of the second biasing spring 123, it is positioned within cavities 135, 137 formed in the first dynamic body 122 and second dynamic body 132.

Similar to how the first dynamic body is maintained within the interior 119 of the central body 111, the second dynamic body 132 is kept within the working head 124 against the biasing force of the second biasing spring 133 with a stopper 138 and stopping ledge 139 located on the interior wall of the working head 124. When an opposing force is applied to the second dynamic body 132, second biasing spring 133 is compressed until space 141 is eliminated, as shown in FIG. 13. In a preferred embodiment, space 141 forms a channel that spans about ¼-¾ of an inch.

During use of the maintenance device 110, the male connector portion MC enters the working head 124 until the top of the male connector portion MC contacts cleaning arms 130, 130. As additional downward force is applied by a user, the second dynamic body 132 is forced upward against the second biasing spring 133 leading to a reduction in space 141 and retraction of the second dynamic body 132. As shown in FIG. 13, as the second dynamic body 132 retracts, cleaning arms 130, 130 are progressively forced by the interior wall lip 143 of the working head 124 to pivot inward toward a cleaning position from a flared position until the arms 130, 130 are moved into a substantially downwardly aligned position. Thus, the retracting motion of the second dynamic body 132 combined with the interior wall lip 143 urges the arms 130, 130 inward toward a cleaning position. When the male cleaning mechanism 120 of the maintenance device 110 is in use, tension elements 140, 140 are flexed laterally outward to a modest degree.

When the male cleaning mechanism 120 of maintenance device 110 is in use, the arms 130, 130 bear against the exterior of the male connector portion MC. As the maintenance device 10 is twisted, the abrasive surface 145 of the arms 130, 130 clean corrosion and other unwanted build-up from male connector wall. Thereafter, upon disengagement of the second dynamic body 132 from the top of the male connector portion MC, the second biasing spring 133 forces second dynamic body 133 back to its relaxed and extended position. Upon disengagement, tension elements 140, 140 resume a downward orientation, thereby causing male cleaning arms 130, 130 to again assume a flared position.

As shown in FIG. 12, FIG. 13 and FIG. 14, outbound flow of lubricant from the reservoir 180 to the male connector portion MC and/or the arms 130, 130 is controlled and restricted by reservoir output valve 184. In a preferred embodiment the first biasing spring 123 is heavier and requires more force to compress than second biasing spring 133. This allows the second dynamic body 132 to retract and the second biasing spring 133 to compress without necessarily causing the first dynamic body 122 to retract and first dynamic spring 123 to compress. However, when sufficient force is applied, both the second dynamic body 132 and the first dynamic body 122 will compress thus allowing the output valve 184 to release lubricant into the lubrication channel 182, as shown in FIG. 14.

In a preferred embodiment, the maintenance device 110 may also include a one-way air intake on the lubrication container 181 to aid or force the flow of lubricant when the maintenance device 110 is used. Likewise, a pump or other conventional means known in the art may be provided to force the flow of lubrication. Preferably, the intake should allow air to displace lubricant as it is being utilized so that the lubricant container does not inwardly collapse. By the same token, the walls of the lubricant container should be of a sufficient thickness to resist collapsing through routine handling.

As can be appreciated from the foregoing description, movement and compression of the first dynamic body 122 essentially provides for lubrication, while movement and compression of the second dynamic body 132 results in the cleaning of the fastener. While such a preferred embodiment comprises two dynamic bodies 122, 132, one may create an alternate embodiment of the maintenance device that utilizes only one dynamic body, such that the dynamic body for lubrication is eliminated, but the dynamic body for cleaning is still utilized. In that regard, a single dynamic body which carries outwardly biased cleaning arms which pivot inward when the dynamic body is compressed against a biasing spring may be provided without provided a second dynamic body for lubrication. In such an embodiment lubrication from the container may be provided by other means such as by a release valve that is actuated by a conventional button or by another release actuator.

Maintenance device 110 further includes a female cleaning mechanism 150 positioned in a depression 152 in the bulbous container 181. Female cleaning arms 160, 160 are hingedly attached to the container 181 at the base of the depression 152. Like the male counterparts, female cleaning arms 160, 160 preferably include an abrasive or otherwise harsh material 165 to effectively clean a fastener having dirt or salt thereon. However, it should be understood that less harsh materials, such as terrycloth, may be utilized as well.

As with the first preferred embodiment, the female cleaning arms 160, 160 of the female cleaning mechanism 150 are vertically oriented and biased outward with tension elements. Thus, while the male cleaning arms 130, 130 are intended to flare outward only when the male cleaning mechanism 120 is in a relaxed position, the female arms 160, 160 are biased outward at all times. While the female arms 160, 160 are biased outwards, the tension elements and depression wall 154 prevent the female cleaning arms 160, 160 from becoming fully extended. Upon engagement with a female connector portion FC, female cleaning arms 160, 160 are forced slightly inward, thereby applying increased outward pressure to the female connector portion with abrasive surface 62.

In a preferred embodiment, the exterior surface of the maintenance device, whether at the central body 111 or the container 181 comprises a knurled or textured surface to supply added friction and to prevent the device 110 from slipping out of the hand of a user during use. Alternatively, the device may comprise indents to allow a user to generate the necessary torque to compress and rotate the device while minimizing the risk of slippage.

The accompanying drawings only illustrate several embodiments of a maintenance device for a snap or fastener and its respective constituent parts, however, other types and styles are possible, and the drawings are not intended to be limiting in that regard. Thus, although the description above and accompanying drawings contains much specificity, the details provided should not be construed as limiting the scope of the embodiments but merely as providing illustrations of some of the presently preferred embodiments. The drawings and the description are not to be taken as restrictive on the scope of the embodiments and are understood as broad and general teachings in accordance with the present invention. While the present embodiments of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention.

The invention claimed is:

1. A maintenance device for a fastener, comprising:
a central body having an interior and an upper end and a lower end;
a lubricant container, said lubricant container being removably attached to said upper end of said central body;
a first dynamic body positioned partially within said central body and forming a working head;
a first biasing spring positioned between said central body and said first dynamic body, said first biasing spring biasing said first dynamic body in a downward direction;
a second dynamic body positioned partially within said first dynamic body;
a second biasing spring positioned between said first dynamic body and said second dynamic body, said second biasing spring biasing said second dynamic body in a downward direction; and
a pair of cleaning arms pivotally connected to said second dynamic body;
wherein when said second dynamic body is compressed, said cleaning arms pivot to engage said fastener.

2. The maintenance device of claim 1, wherein said cleaning arms have an abrasive surface.

3. The maintenance device of claim 1, further comprising a reservoir output valve.

4. The maintenance device of claim 3, wherein when said first dynamic body is sufficiently compressed, said reservoir output valve releases lubricant.

5. The maintenance device of claim 1, further comprising a stopper and a stopping ledge, wherein said stopper and stopping ledge maintain said first dynamic body within the interior of the central body.

6. The maintenance device of claim 1, further comprising a stopper and a stopping ledge, wherein said stopper and said stopping ledge maintain said second dynamic body within the working head.

7. The maintenance device of claim 1, wherein said first pair of cleaning arms are initially biased outward and then pivot inward when said second dynamic body is compressed.

8. The maintenance device of claim 1, further comprising a female cleaning mechanism having a second pair of cleaning arms connected to said lubrication container.

9. The maintenance device of claim 8, wherein said second pair of cleaning arms are initially biased outward and then pivot inward when said cleaning arms engage a fastener.

10. The maintenance device of claim 1, further comprising a lubrication channel between said container and said second dynamic body.

11. A maintenance device for a fastener, comprising:
a central body having an upper end and a lower end;
a lubricant container, said lubricant container being removably attached to said upper end of said central body;
a dynamic body connected to said lower end of said central body and configured to alternate between an extended position and a retracted position;
a cleaning mechanism comprising a pair of cleaning arms that are in a flared position when said dynamic body is in said extended position;
wherein when said dynamic body is moved to a retracted position, said cleaning arms pivot inward from said flared position.

12. The maintenance device of claim 11, wherein said central body is in the configuration of a spool.

13. The maintenance device of claim 11, further comprising a divider positioned between said lubricant container and said dynamic body.

14. The maintenance device of claim 13, further comprising a release valve at said divider.

15. The maintenance device of claim 14, wherein said release valve is operable to release lubricant into a lubrication channel.

16. The maintenance device of claim 15, further comprising a movable body positioned between said central body and said dynamic body and biased to an extended position relative to said central body, wherein said movable body is positioned to release lubricant into said lubrication channel when said movable body is compressed relative to said central body.

17. The maintenance device of claim 11, further comprising a working head positioned around said dynamic body.

18. The maintenance device of claim 17, further comprising an interior wall lip on said working head, wherein as said dynamic body is moved into a retracted position, said cleaning arms are progressively forced by the interior wall to pivot inward.

19. The maintenance device of claim 11, further comprising a second pair of cleaning arms positioned in a depression in said lubricant container.

20. The maintenance device of claim 19, wherein said second pair of cleaning arms are outwardly oriented to engage a female connector portion of a fastener.

* * * * *